United States Patent Office 3,663,652
Patented May 16, 1972

3,663,652
POLYURETHANE RESINS IN ADMIXTURE WITH POLYEPOXIDES
John Allister Cannon and Jerome Earl Malone, Toms River, N.J., assignors to Ciba-Geigy Corporation, Ardsley, N.Y.
No Drawing. Filed Oct. 27, 1970, Ser. No. 84,468
Int. Cl. C08g 45/12, 45/08, 45/10
U.S. Cl. 260—830 P    10 Claims

ABSTRACT OF THE DISCLOSURE

Compositions comprising carboxyl containing polyurethane resins and di- or polyepoxide resins. The compositions when cured have excellent adhesion to untreated and treated substrates, excellent flexibility and good resistance to chemical attack.

SUMMARY OF THE INVENTION

The present invention relates to novel compositions comprising carboxyl containing polyurethane polymers, (prepared by the reaction of an organic polyisocyanate and a 2,2-di-(hydroxymethyl)carboxylic acid), and di- and/or polyepoxides. These compositions form excellent cured coatings on untreated and treated substrates, as well as being surprisingly useful as adhesives and laminates. The invention also relates to the use of said compositions in coatings, adhesives and laminates.

DESCRIPTION OF THE INVENTION

It has been surprisingly found that compositions comprising a mixture of a polyurethane polymer containing free carboxylic acid groups, and di- and/or polyepoxides (hereinafter both called polyepoxides) lead to cured resins which as coatings demonstrate surprising adhesion to untreated and treated substrates.

The present invention is therefore directed to compositions comprising a mixture of polyurethane polymers and di- and/or polyepoxides and mixtures thereof and to cured compositions derived from the above-mentioned compositions. The polyurethane polymers of the invention are those prepared by the reaction of an organic polyisocyanate with acid polyols of the class designated as 2,2-di(hydroxymethyl)carboxylic acid (or acid polyols and other active hydrogen compounds) said acids containing a free carboxylic acid group which is substantially unreactive toward isocyanates. The acids more particularly are compounds of the formula

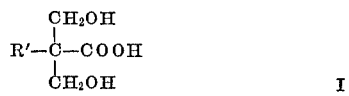

wherein R' represents hydrogen, alkyl of up to 20 carbon atoms, preferably from 1–8 carbon atoms and especially 1–3 carbon atoms. Representative compounds of this class are 2,2 - di(hydroxymethyl)-acetic acid, 2,2-di(hydroxymethyl)propionic acid, 2,2 - di(hydroxymethyl)butyric acid, 2,2-di(hydroxymethyl)pentanoic acid and the like. The preferred compound being 2,2 - di(hydroxymethyl) propionic acid.

The organic polyisocyanates may be aromatic, Ar-aliphatic, aliphatic or cycloaliphatic diisocyanates. The diisocyanates may be further represented by the following structural formula

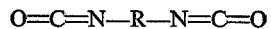

wherein R is phenylene or phenylene substituted with one or two, lower alkyl of from 1–5 carbon atoms, lower alkoxy of from 1–5 carbon atoms, chloro or nitro; naphthylene or substituted naphthylene as described for phenylene; straight or branched lower alkylene of from 2–10 carbon atoms, preferably 2–9, such as ethylene, pentylene, 2,2,4- or (2,4,4) - trimethyl-hexamethylene; cycloalkylene of from 5–7 carbon atoms, such as cyclopentylene each of which may be substituted with 1 or 2 of lower alkyl of from 1–5 carbon atoms, lower alkoxy of from 1–5 carbon atoms, chloro or nitro;

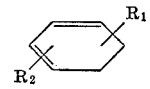

wherein $R_1$ and $R_2$ are the same or different and are lower alkylene radicals of from 1–6 carbons; as well as such compounds which are further substituted on the aromatic moiety with 1 or 2 of lower alkyl of up to 5 carbon atoms, lower alkoxy, chloro or nitro; alkyl dicarboxylic acid esters of up to 10 carbon atoms, wherein each isocyanate moiety is attached to the group used to form the ester from the corresponding dicarboxylic acid; the latter may be represented by the following formula $$R_4OOC-R_3-COOR_4$$

wherein $R_3$ is lower alkylene or lower alkenylene of from 1–10 and 2–10 carbon atoms respectively, preferably 1–5 carbons; and $R_4$ is an isocyanate substituted lower alkylene of up to 5 carbon atoms, such as 2-isocyanatopropyl, 2 - isocyanatoethyl, 3 - isocyanatobutyl and the like; $R_3$ being derived from an aliphatic dicarboxylic acid such as fumaric acid, succinic acid or adipic acid.

The polyisocyanate may also be derived from an inorganic base such as a carbonate and may be bis(isocyanatoloweralkyl)carbonate, the isocyanatoloweralkyl containing up to 5 carbon atoms such as those described for $R_3$ above.

Similarly, the polyisocyanate may be an alicyclic compound of the formula

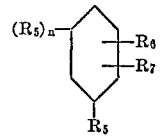

wherein $R_5$ is hydrogen or lower alkyl of up to 5 carbon atoms, $n$ is 0–2, and $R_6$ and $R_7$ are the same or different and are —NCO or $R_8NCO$, wherein $R_8$ is lower alkyl of up to 5 carbon atoms. Compounds of this class that may be mentioned are:

3-isocyanato-ethyl-3,5,5-trimethylcyclohexyl-isocyanate,
3,5,5-trimethylcyclohexylene-diisocyanate,
3,5,5-trimethylcyclohexyl-1,3-diisocyanate and
1,3-isocyanomethyl-3,5,5-trimethylcyclohexane.

Some of the specific organic diisocyanates that can be employed in the invention are tolylene diisocyanate, bis-(4-isocyanatophenyl)methane, xylylene diisocyanate, bis-(2 - isocyanatoethyl)fumarate, bis(2 - isocyanatopropyl) fumarate, bis(2-isocyanatoethyl)carbonate.

The more preferred polyisocyanates are the aromatic, aliphatic and alicyclic of the formula $$O=C=N-R-N=C=O$$

wherein R is phenylene, tolylene, such as o-phenylene, m-phenylene, tolylene-2,4, tolylene-2,6 or mixtures of the latter two;

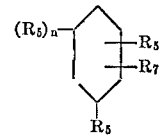

wherein $R_5$ is hydrogen or lower alkyl of up to 5 carbon atoms, $n$ is 0–2, and $R_5$ and $R_7$ are the same or different and are —NCO or $R_8$NCO, wherein $R_8$ is lower alkyl of up to 5 carbon atoms; or 2,2,4 or (2,4,4)pentylenehexamethylene.

The polyurethane component of the composition is prepared by reaction of the acid polyol with the diisocyanate by the usual conventional procedures. For example, the acid can be reacted with an organic diisocyanate and if desired one or more additional active hydrogen compounds such as various diols, dithiols and diphenols. If additional active hydrogen compounds are employed, one must use at least 20% of a 2,2-di(hydroxymethyl)carboxylic acid. The following additional active hydrogen compounds can be employed if desired: ethylene glycol, diethylene glycol, propylene glycol, dipropylene glycol, butylene glycol, glycerol, 1,1,1-trimethylolpropane, 1,1,1-trimethylolethane, 1,2,6-hexanetriol, pentaerythritol, polypropylene glycols having molecular weights of up to about 1000, hydroxyl-terminated polyesters and lactone polymers having molecular weights of up to about 1000, oleyl alcohol, linolenyl alcohol; dithiols of up to 10 carbon atoms, such as decamethylene dithiol, hexamethylene dithiol. Preferred active hydrogen compounds are lower alkyl-diols of from 1 to 6 carbon atoms, such as 1,4-butanediol, 2,2-dimethyl-1,3-propanediol, 1,6-hexanediol, diethylenediol.

It is preferred that the diisocyanate compound be employed in an amount sufficient to react with all of the active hydrogen compounds, that is in a 1:1 equivalent basis, although the ratio of diisocyanate to active hydrogen compounds may vary from 0.1 to 5.0:1 equivalent. More specifically the polyurethane polymer is prepared as follows: The active hydrogen components are charged to a suitable reaction vessel equipped with stirrer, condenser, heat transfer means, and the like. It is usually desirable to employ an inert solvent such as acetone, ethoxyethyl acetate, or the like. The isocyanate is then charged and the mixture is heated to, for example, 50° to 120° C. until all of the isocyanate has reacted. If desired, catalyst such as dibutyltin dilaurate, stannous octoate, and the like can be employed to accelerate the reaction of isocyanate with the other components. At the completion of the reaction (which usually takes from about 2 to about 8 hours, depending on temperature, presence or absence of catalysts and the like), the polymer can be recovered by removing the inert diluent by distillation, if desired.

On the other hand in the more preferred procedure the polyurethane polymer thus obtained is combined in situ with the desired polyepoxide, resulting in the composition in an inert solvent.

The polyepoxide component of the novel composition is one containing more than 1,2 epoxy group per molecule, and may suitably be derived from aliphatic, aromatic, heterocyclic Ar-aliphatic, cycloaliphatic compounds or mixtures thereof. Possible epoxide compounds of the type defined above are for example: vinylcyclohexene dioxide, limonene dioxide, dicyclopentadiene dioxide, ethylene glycol-bis(3,4-epoxytetrahydrodicyclopentadien-8 - yl) ether, (3,4 - epoxytetrahydrodicyclopentadien-8-yl) glycidyl ether, epoxidized polybutadienes or copolymers of butadiene with ethyleneically unsaturated compounds such as styrene or vinyl acetate; compounds having two epoxycyclohexyl residues such as diethylene glycol-bis-(3,3 - epoxycyclohexane-carboxylate), bis - 3,4-(epoxycyclohexylmethyl)-succinate, 3,4 - epoxy-6-methyl-cyclohexylmethyl-3',4'-epoxy - 6' - methyl-cyclohexanecarboxylate and 3,4 - epoxyhexahydrobenzal-3',4'-epoxycyclohexane-1',1'-dimethanol.

Further possible materials are polyglycidyl esters such as are obtainable by reacting a dicarboxylic acid or cyanuric acid with epichlorhydrin or dichlorhydrin in the presence of alkali. Such polyesters may be derived from aliphatic dicarboxylic acids such as succinic acid or adipic acid and especially from aromatic dicarboxylic acids such as phthalic acid or terephthalic acid. Diglycidyl adipate, diglycidyl phthalate and triglycidyl isocyanurate may for example be mentioned.

Polyglycidyl ethers such as are obtainable by etherification of a dihydric or polyhydric alcohol or diphenol or polyphenol with epichlorhydrin or dichlorhydrin in the presence of alkali are preferentially used. These compounds may be derived from glycols such as ethylene glycol, diethylene glycol, triethylene glycol, 1,3-propylene glycol, 1,4-butanediol, 1,5-pentanediol, 1,6-hexanediol, 2,4,6-hexanetriol, glycerine, and especially from diphenols or polyphenols such as resorcinol, pyrocatechol, hydroquinone, phenolphthalein, phenol-formaldehyde condensation products from the type of the novolacs, 1,4-di-hydroxynaphthalene, bis(p-hydroxyphenyl) methane, bis(p-hydroxyphenyl)methyl-phenylmethane, bis(p - hydroxyphenyl(tolylmethane, 4,4'-dihydroxydiphenyl, bis(p-hydroxyphenyl)sulphone and especially bis(p-hydroxyphenyl)dimethylmethane.

Preferred compounds are cycloaliphatic epoxide compounds. For example, there may be mentioned those of the formulae

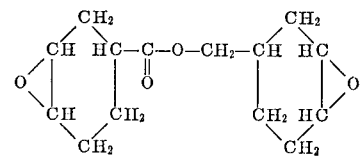

(=3,4 - epoxycyclohexylmethyl - 3',4' - epoxycyclohexanecarboxylate),

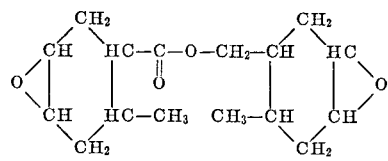

(=3,4 - epoxy - 6 - methylcyclohexylmethyl - 3',4'-epoxy-6'-methyl-cyclohexanecarboxylate) and

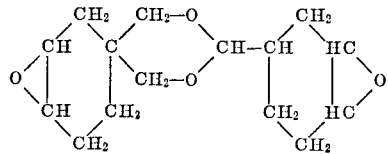

(=3,4 - epoxyhexahydrobenzal - 3',4' - epoxycyclohexane-1',1'-dimethanol).

Amongst the specially suitable heterocyclic epoxide compounds there may be mentioned the triglycidyl isocyanate of the formula

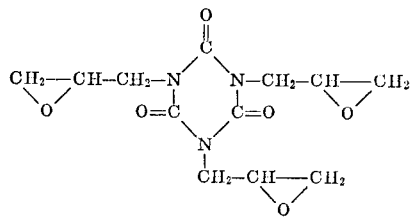

as well as the N,N'-diglycidyl-dimethylhydantoin of the formula

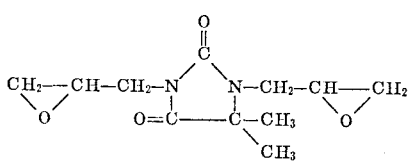

It is also possible to use mixtures of such cycloaliphatic and/or heterocyclic epoxide compounds.

Other preferred compounds are the polyglycidyl ethers of bis(p-hydroxyphenyl)dimethylmethane (bisphenol A) which correspond to the average formula

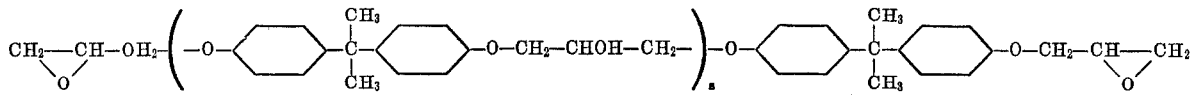

wherein z denotes an integral or fractional small number within the range of 0 to 2.

As indicated previously the epoxide compound may be blended with the polyurethane polymer itself or may be blended in a suitable solvent system, for example, alcohols, ketones, esters and aromatic hydrocarbons, such as methanol, sec-butyl alcohol, propanol, acetone, diethyl acetate, Cellosolve acetate, benzene, toluene, xylene and the like. The final composition is prepared such that between about 0.1 to about 5 equivalents of polyurethane polymers, preferably between about 0.5 to 1.5 equivalents and especially about 1:1 equivalent based on the carboxylic content (derived from the 2,2-di(hydroxymethyl) carboxylic acid) per equivalent of epoxy is obtained. The final composition may suitable contain from about 10 to 90% solids, preferably 25 to about 75% solids and especially from about 30 to about 50% solids. The desired percent solids can be obtained by adding an appropriate amount of inert solvent to make up the desired composition.

The composition thus obtained is extremely suitable for pigmented or unpigmented coil coatings, adhesives and laminates; and permits unexpected rapid curing at temperatures of 250–300° F. The coatings prepared from the compositions of the invention show good adhesion to untreated and treated substrates, such as aluminum, steel, copper and glass, excellent flexibility and good resistance to solvents, acids and boiling water. It has also surprisingly been found that the compositions comprising the polyurethane and bisphenol A-epichlorohydrin type epoxy resins, show excellent stability over a period of several months and accordingly are well suited for use in a one-package system.

The composition may be suitably cured at temperatures of about 250° F. to 350° F. from about 2 to about 10 minutes. The compositions of the invention may be suitably cured with or without curing agents and/or accelerators. When it is desired to employ curing agents and/or accelerators, one may employ, for example, any of the well-known agents such as urea-formaldehyde resins, melamine-formaldehyde resins or phenol-formaldehyde resins, such as Cymel 255–10, Cymel 301, Araldite DP–139, tertiary amines, their salts or quaternary ammonium compounds, for example, 2,4,6-tri-(dimethylaminomethyl)phenol, benzyldimethylamine, 2 - ethyl - 4- methyl-imidazole or trimethylammonium phenolate, alkali metal alcoholates, such as, for example, sodium hexanetriolate; dicyandiamide; phosphonium halide as described in U.S. Pat. No. 3,477,990, or Acryloid AT–50 (a tradename for an acrylic resin sold by Rohm and Haas). The curing agents may be employed on a solid basis in amounts of from 5 to 50% and preferably 10 to 30%. The accelerators may be employed on a solid basis in amounts of from 0.05 to 10% and preferably 0.1 to 5%.

Example I (A) 1 mole (134 g.) of dimethylolpropionic acid is charged to a flask containing Cellosolve acetate (45% N.V.). 1 mole (174 g.) of tolylene diisocyanate is added gradually over a 2 hr. period at 90° C. and then the reaction mixture is held at 194° F. for additional 2–3 hrs. until the isocyanate peak disappears in the infrared. The mixture is then diluted to 35% N.V. with isopropanol.

Acid number=171

(B) The polyurethane resin from part A above is blended with an epoxy resin prepared from bisphenol A and epichlorohydrin having an epoxy value of 0.51 to 0.55 eq. per 100 gms. in a ratio of 1 eq. COOH:1 eq. epoxy (100% N.V. basis)=324 g.:190 g. of epoxy. The resulting composition is then applied by means of a wire wound rod to an untreated aluminum panel. The solvent is evaporated from the panel and the remaining film is cured at 350° F. for 10 minutes—the film exhibited excellent adhesion to untreated aluminum after a 90 minute water boil test.

Similarly, when an equivalent amount of 2,2,4(2,4,4)-pentylene-hexamethylene diisocyanate,
3-isocyanatoethyl-3,5,5-trimethylcyclohexyl-isocyanate,
3,5,5-trimethylcyclohexylene-diisocyanate,
3,5,5-trimethylcyclohexyl-1,3-diisocyanate or
1,3-isocyanomethyl-3,5,5-trimethylcyclohexene is used in place of tolylene diisocyanate in part A above and the product thus obtained is blended with the epoxy of part B and cured similar results are obtained.

Similarly, when an equivalent amount of (3,4-epoxycyclohexylmethyl-3′,4′-epoxycyclohexanecarboxylate),
(3,4-epoxy-6-methylcyclohexylmethyl-3′,4′-epoxy-6′-methylcyclohexanecarboxylate),
(3,4-epoxyhexahydrobenzal-3′,4′-epoxycyclohexane-1′,1′-dimethanol)

or crude diglycidyl ether of hydrogenated bisphenol A having an epoxy value of .4 to .5 eq. per 100 gms. is used in place of the epoxy resin in part B above. similar results are obtained.

Example II (A) 1.25 mole of dimethylolpropionic acid (168 g.) is charged to a flask in Cellosolve acetate (45 N.V.). 1.0 mole of tolylene diisocyanate (174 g.) is added to the dimethylol propionic acid over a 2 hr. period. At a reaction temperature of 194° F. the reaction is then continued for an additional 2.5 hrs.

Final solids=26.6%
Acid number=211

(B) The polyurethane resin from part A above is blended with an epoxy resin prepared from bisphenol A and epichlorohydrin having an epoxy value of 0.51 to 0.55 eq. per 100 gms. in a ratio of 1 eq. COOH:1 eq. epoxy (100% N.V. basis)=266 g.:190 g. of epoxy. The resulting composition is then applied by means of a steel rod to an untreated aluminum panel. The solvent is evaporated from the panel and the remaining film is cured at 350° F. for 10 minutes—the film exhibited excellent adhesion to untreated aluminum after a 90 minute water boil test.

Similarly, when part A above is carried out at 122° F. (10 hrs.), 158° F. (6 hrs.) or 230° F. (3 hrs.) instead of 194° F., similar results are obtained.

Similarly, when the cure as shown in part B above is carried out at 275° F., 300° F. or 375° F. instead of 350° F., similar results are obtained.

Similarly, when toluene or methylethyl ketone is used in place of Cellosolve acetate in part A above, similar results are obtained.

Example III (A) 1.5 moles of dimethylolpropionic acid (201 g.) is charged to a flask in Cellosolve acetate (45% N.V.). 1.0 mole of tolylene diisocyanate (174 g.) is added to dimethylolpropionic acid over a 2 hr. period at a reaction temperature of 194° F. The reaction is then continued for an additional 3.0 hrs.

Final solids=23%
Acid number=225

(B) The polyurethane resin from part A above is blended with an epoxy resin prepared from bisphenol A and epichlorohydrin having an epoxy value of 0.51 to 0.55 eq. per 100 gms. in a ratio of 1 eq. COOH:1 eq. epoxy (100% N.V. basis)=251 g.:190 g. of epoxy. The resulting composition is then applied by means of a wire wound rod to an untreated aluminum panel. The solvent is evaporated from the panel and the remaining film is cured at 350° F. for 10 minutes—the film exhibits excellent adhesion to untreated aluminum after a 90 minute water boil test.

Example IV

The polyurethane resins from Example III, part A above is blended with an epoxy resin prepared from bisphenol A and epichlorohydrin in a ratio of 1 eq. COOH:1 eq. epoxy (100% N.V. basis)=251 g.:190 g. of epoxy. The resinous mixture is then blended with a melamine-formaldehyde curing agent, Cymel 255-10, in a ratio of 80 parts of polyurethane/epoxy mixture to 20 parts of the former and the entire composition is cured at 250° F. for 10 minutes on untreated aluminum. The film exhibits excellent adhesion to untreated aluminum after a 90 minute water boil test.

Example V

The polyurethane resin from Example III, part A, is blended with an epoxy resin prepared from bisphenol A and epichlorohydrin in a ratio of 1 eq. COOH:1 eq. epoxy (100% N.V. basis)=251 g.:190 g. of epoxy. The resinous mixture is then blended with 0.5% by weight of dicyandiamide as an accelerator for the polyurethane-epoxy resin cure. Curing at 250° F. for 10 minutes on untreated aluminum resulted in excellent adhesion of the coating after a 90 minute water boil test.

Example VI

The polyurethane resin from Example I, part A, is blended with Araldite 6010 (crude diglycidyl ether of bisphenol A) in the following ratio:

Polyurethane resin—925 grams (35% N.V. solution)
Araldite 6010—190 grams (100% N.V.)

A quantity of methyl ethyl ketone equal to 4025 grams is added to provide a final total solids of 10%.

Similarly, the following quantities of solvent are employed with the aforementioned resin blend to reduce the solids content:

Methyl ethyl ketone, grams:     Final percent solids
941 ------------------------------------- 25
353 ------------------------------------- 35

A polyurethane resin as described in Example I, part A, is prepared employing a quantity of Cellosolve acetate solvent to provide 55% N.V. (252 grams). The resin is then blended with Araldite 6010 in the following ratio:

Polyurethane resin—560 grams (55% N.V. solution)
Araldite 6010—190 grams (100% N.V.)

A quantity of methyl ethyl ketone equal to 495 grams is added to provide a final total solids of 40%.

Omission of the methyl ethyl ketone in the formulation provides a composition with a final total solids=66%.

Example VII

In accordance with Examples VI and VII, the following compositions are prepared:

Polyurethane/CY-179
Urethane/6010
Urethane/6010/0.5% TMAC
Urethane/6010/0.3% Dicy.
Urethane/6010/0.4% Dicy.
Urethane/6010/0.5% Dicy.
Urethane/6010/1.0% Dicy.
Urethane/6010/2% 1,3 DMU
Urethane/6010/3% 1,3 DMU
Urethane/6010/4% 1,3 DMU
Polyurethane/6010/5% 1,3 DMU
Urethane/6010/20% Cymel 255-10
Urethane/6010/20% DP 139
Urethane/6010/20% P 196-60
Urethane/6010/20% Cymel 301
Urethane/20% Cymel 255-10
Urethane/20% DP 139
Urethane/20% P 196-60
Urethane/20% Cymel 301

CHEMICAL COMPOSITIONS

CY-179—3,4-epoxycyclohexylmethyl-3',4'-epoxycyclohexanecarboxylate
6010—crude diglycidyl ether of bisphenol A
TMAC—tetramethylammonium chloride
Dicy.—dicyandiamide
1,3 DMU—1,3 dimethylurea
Cymel 255-10—melamine-formaldehyde resin
Araldite DP-139—bisphenol A-formaldehyde resin
P-196-60—urea-formaldehyde resin
Cymel 301—hexamethoxymethyl melamine These compositions are then cured at 250° F. for 10 minutes (for polyurethane/6010—10 minutes at 275° F.) on untreated aluminum as described in Example I. The cured film shows excellent dry adhesion in a cross cut test.

We claim:

1. A composition comprising a polyurethane polymer containing free carboxylic acid groups and a polyepoxide containing more than one 1,2 epoxy groups per molecule, the ratio of said polyurethane to polyepoxide being from 0.1 to 5.0 equivalents, said polyurethane being prepared by reaction of a polyisocyanate and an active hydrogen compound selected from the group consisting of acid polyols and a mixture of at least 20% acid polyol and an active hydrogen compound, said polyol is selected from the group consisting of a compound of the formula $$R'-\underset{\underset{CH_2OH}{|}}{\overset{\overset{CH_2OH}{|}}{C}}-COOH$$

wherein R' is hydrogen, alkyl of up to 20 carbon atoms, or hydroxymethyl; the ratio of said polyisocyanate to active hydrogen compound being from about 0.1 to 5.0:1 equivalents.

2. A composition according to claim 1 wherein the polyisocyanate is a compound selected from the group consisting of the formula

O=C=N—R—N=C=O wherein R is phenylene or phenylene substituted with one or two lower alkyl, lower alkoxy, chloro or nitro; naphthylene or naphthylene substituted with one or two lower alkyl, lower alkoxy, chloro or nitro; lower alkylene, cycloalkylene or cycloalkylene substituted with one or two of lower alkyl, lower alkoxy, chloro or nitro;

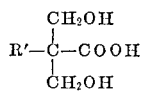

wherein $R_1$ and $R_2$ are the same or different and are each lower alkylene; alkyl dicarboxylic acid ester: diisocyanatoloweralkylcarbonate and

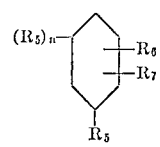

wherein $R_5$ is hydrogen or lower alkyl of up to 5 carbon atoms, $n$ is 0–2, and $R_6$ and $R_7$ are the same or different and are $$-\overset{H}{N}CO \quad \text{or} \quad R_8\overset{|}{N}CO$$

wherein $R_8$ is lower alkyl of up to 5 carbon atoms; and the acid polyol is a compound of the formula $$R'-\underset{\underset{CH_2OH}{|}}{\overset{\overset{CH_2OH}{|}}{C}}-COOH$$

wherein $R'$ is hydrogen, alkyl of up to 20 carbon atoms or hydroxymethyl.

3. A composition of claim 2, wherein R is phenylene, tolylene,

[structure with $(R_5)_n$, $R_6$, $R_7$, $R_5$ on benzene ring]

wherein $R_5$ is hydrogen or lower alkyl of up to 5 carbon atoms, $n$ is 0–2, and $R_6$ and $R_7$ are the same or different and are $$-\overset{H}{N}CO \quad \text{or} \quad R_8\overset{|}{N}CO$$

wherein $R_8$ is lower alkyl of up to 5 carbon atoms; 2,2,4 or (2,4,4)pentylenehexamethylene.

4. A composition of claim 3 wherein said acid polyol is 2,2-di(hydroxymethyl)propionic acid.

5. A composition of claim 2 wherein the polyepoxide is selected from the group consisting of cycloaliphaticepoxide and polyglycidyl ether of bisphenol A.

6. A composition of claim 2 wherein R is phenylene, tolylene,

[structure with $(R_5)_n$, $R_6$, $R_7$, $R_5$ on benzene ring]

wherein $R_5$ is hydrogen or lower alkyl of up to 5 carbon atoms, $n$ is 0–2, and $R_6$ and $R_7$ are the same or different and are $$-\overset{H}{N}CO \quad \text{or} \quad R_8\overset{|}{N}CO$$

wherein $R_8$ is lower alkyl of up to 5 carbon atoms, 2,2,4 or (2,4,4)pentylenehexamethylene; the polyepoxide is selected from the group consisting of cycloaliphaticepoxide and polyglycidyl ether of bisphenol A and the acid polyol is 2,2-di(hydroxymethyl)propionic acid.

7. A composition according to claim 2 wherein a curing agent is present.

8. A composition according to claim 2 wherein an accelerator is present.

9. A cured composition comprising the reaction product of a polyurethane polymer, prepared from the reaction of a polyisocyanate and an active hydrogen compound selected from the group consisting of an acid polyol or a mixture of at least 20% of an acid polyol and other active hydrogen compound, the ratio of said polyisocyanate to active hydrogen compound being from about 0.1 to 5.0:1 equivalent, said polyisocyanate being selected from the group consisting of the formula $$O=C=N-R-N=C=O$$

wherein R is phenylene or phenylene substituted with one or two lower alkyl, lower alkoxy, chloro or nitro; naphthylene or naphthylene substituted with one or two lower alkyl, lower alkoxy, chloro or nitro; lower alkylene, cycloalkylene or cycloalkylene substituted with one or two of lower alkyl, lower alkoxy, chloro or nitro;

[structure with $R_2$, $R_1$ on benzene ring]

wherein $R_1$ and $R_2$ are the same or different and are each lower alkylene; alkyl dicarboxylic acid ester: diisocyanatoloweralkylcarbonate and

[structure with $(R_5)_n$, $R_6$, $R_7$, $R_5$ on benzene ring]

wherein $R_5$ is hydrogen or lower alkyl of up to 5 carbon atoms, $n$ is 0–2, and $R_6$ and $R_7$ are the same or different and are $$-\overset{H}{N}CO \quad \text{or} \quad R_8\overset{|}{N}CO$$

wherein $R_8$ is lower alkyl of up to 5 carbon atoms; and the acid polyol is a compound of the formula $$R'-\underset{\underset{CH_2OH}{|}}{\overset{\overset{CH_2OH}{|}}{C}}-COOH$$

wherein $R'$ is hydrogen, alkyl of up to 20 carbon atoms or hydroxymethyl; with a polyepoxide, containing more than one 1,2 epoxy groups per molecule, the ratio of said polyurethane to said polyepoxide being from about 0.1 to 5.0:1 equivalents.

10. A composition according to claim 9 wherein R is phenylene, tolylene,

[structure with $(R_5)_n$, $R_6$, $R_7$, $R_5$ on benzene ring]

wherein $R_5$ is hydrogen or lower alkyl of up to 5 carbon atoms, $n$ is 0–2, and $R_6$ and $R_7$ are the same or different and are $$-\overset{H}{N}CO \quad \text{or} \quad R_8\overset{|}{N}CO$$

wherein $R_8$ is lower alkyl of up to 5 carbon atoms, 2,2,4- or (2,4,4)pentylenehexamethylene; the polyepoxide is selected from the group consisting of cycloaliphaticepoxide and polyglycidyl ether of bisphenol A and the acid polyol is 2,2-di(hydroxymethyl)propionic acid.

References Cited

UNITED STATES PATENTS

| | | | |
|---|---|---|---|
| 2,907,745 | 10/1959 | Greenlee | 260—830 P |
| 3,412,054 | 11/1968 | Milligan | 260—75 TNP |
| 3,380,950 | 4/1968 | Blomeyer | 260—830 P |
| 3,510,439 | 5/1970 | Kaltenbach | 260—830 P |
| 3,525,779 | 8/1970 | Hawkins | 260—830 P |

PAUL LIEBERMAN, Primary Examiner

U.S. Cl. X.R.

260—77.5 AP, 830 TW, 831, 834, 836, 837 R